United States Patent
Ichinose

(10) Patent No.: US 10,834,326 B2
(45) Date of Patent: Nov. 10, 2020

(54) INTERCHANGEABLE LENS APPARATUS, ITS CONTROL METHOD, AND IMAGING APPARATUS

(71) Applicant: CANON KABUSHIKI KAISHA, Tokyo (JP)

(72) Inventor: Masami Ichinose, Utsunomiya (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 0 days.

(21) Appl. No.: 16/423,724

(22) Filed: May 28, 2019

(65) Prior Publication Data

US 2019/0373178 A1    Dec. 5, 2019

(30) Foreign Application Priority Data

May 30, 2018 (JP) .................................. 2018-103559

(51) Int. Cl.
*H04N 5/232* (2006.01)
*G02B 7/10* (2006.01)
*H04N 5/225* (2006.01)

(52) U.S. Cl.
CPC ......... *H04N 5/23296* (2013.01); *G02B 7/102* (2013.01); *H04N 5/2254* (2013.01); *H04N 5/23212* (2013.01)

(58) Field of Classification Search
CPC ............. H04N 5/23296; H04N 5/2254; H04N 5/23212; H04N 5/23209; H04N 5/23241;
(Continued)

(56) References Cited

U.S. PATENT DOCUMENTS 5,604,562 A * 2/1997 Aoyama ................. G02B 7/102
   396/121
5,765,055 A * 6/1998 Miyazawa ............. G03B 17/14
   396/137
(Continued)

FOREIGN PATENT DOCUMENTS

JP    H01108514 A    4/1989
JP    H06194565 A    7/1994
(Continued)

OTHER PUBLICATIONS

Notice of Reasons for Rejection issued by the Japanese Patent Office dated Jul. 9, 2019 in corresponding Japanese Patent Application No. 2018-103559, with English translation.

*Primary Examiner* — Timothy J Henn
(74) *Attorney, Agent, or Firm* — Carter, DeLuca & Farrell LLP

(57) ABSTRACT

An interchangeable lens apparatus includes a control unit that performs a first focus control for controlling the driving unit in response to an autofocus use signal from the imaging apparatus, a second focus for controlling the driving unit in response to an operation of the operation member detected by the detecting unit, and a third focus control for controlling the driving unit as a focus control different from the first focus control and the second focus control. Where the first focus control is selected by a selection unit that selects one of the first focus control and the second focus control, the control unit restricts the second focus control when not receiving a permission signal for permitting the third focus control from the imaging apparatus, and performs the second focus control according to the operation of the operation member when receiving the permission signal.

8 Claims, 3 Drawing Sheets

(58) Field of Classification Search
CPC ........... H04N 5/23287; H04N 5/23258; H04N 5/232123; G02B 7/102; G03B 17/14
See application file for complete search history.

(56) References Cited

U.S. PATENT DOCUMENTS

| | | | | |
|---|---|---|---|---|
| 2002/0075395 | A1* | 6/2002 | Ohkawara | H04N 5/23209 |
| | | | | 348/347 |
| 2007/0242940 | A1* | 10/2007 | Yumiki | G03B 3/02 |
| | | | | 396/79 |
| 2012/0057062 | A1* | 3/2012 | Hamada | H04N 5/23212 |
| | | | | 348/333.02 |
| 2012/0243856 | A1* | 9/2012 | Shibuno | G03B 17/14 |
| | | | | 396/76 |
| 2016/0323513 | A1* | 11/2016 | Takahashi | H04N 5/23293 |

FOREIGN PATENT DOCUMENTS

| | | |
|---|---|---|
| JP | H0850231 A | 2/1996 |
| JP | H09203855 A | 8/1997 |
| JP | H09203856 A | 8/1997 |
| JP | 2001013398 A | 1/2001 |
| JP | 2004118219 A | 4/2004 |
| JP | 2012212989 A | 11/2012 |
| JP | 2013117612 A | 6/2013 |
| JP | 2013117613 A | 6/2013 |

* cited by examiner

| | | bit | | | | | | | |
|---|---|---|---|---|---|---|---|---|---|
| | | 7 | 6 | 5 | 4 | 3 | 2 | 1 | 0 |
| MF CONTROL | PERMISSION | 1 | | | | | | | |
| | PROHIBITION | 0 | | | | | | | |
| FP CONTROL | PERMISSION | | 1 | | | | | | |
| | PROHIBITION | | 0 | | | | | | |
| ZF CONTROL | PERMISSION | | | 1 | | | | | |
| | PROHIBITION | | | 0 | | | | | |
| UNUSED | | | | | 0 | | | | |
| UNUSED | | | | | | 0 | | | |
| UNUSED | | | | | | | 0 | | |
| UNUSED | | | | | | | | 0 | |
| UNUSED | | | | | | | | | 0 |

INTERCHANGEABLE LENS APPARATUS, ITS CONTROL METHOD, AND IMAGING APPARATUS

BACKGROUND OF THE INVENTION

Field of the Invention

The present invention relates to an interchangeable lens apparatus (simply referred to as an interchangeable lens hereinafter) which can provide a manual focus control according to an operation of an operation ring.

Description of the Related Art

A lens interchangeable imaging system often has an autofocus (AF) mode that provides the AF according to a focus state detected by an imaging apparatus, and a manual focus (MF) mode that detects a rotation of an operation ring of the interchangeable lens with a sensor, and provides the MF according to the rotation. Performing the MF during the imaging in the AF mode may be demanded. For example, where it is difficult to obtain an in-focus state by the AF when the object has a low luminance or low contrast, the user may obtain the in-focus state quickly with the MF.

Japanese Patent Application Laid-Open No. ("JP") 2001-013398 discloses an imaging system which is automatically switched from the AF mode to the MF mode by detecting the operation of the operation ring during imaging in the AF mode.

However, when the AF mode is switched to the MF mode by the operation of the operation ring as disclosed in JP 2001-013398, the user needs to switch the MF mode to the AF mode for imaging in the subsequent AF.

SUMMARY OF THE INVENTION

The present invention provides an interchangeable lens apparatus and an imaging apparatus, which can provide an MF without switching to an MF mode when the AF mode is selected.

An interchangeable lens apparatus according to one aspect of the present invention is detachably and communicatively attached to an imaging apparatus. The interchangeable lens apparatus includes a focus lens configured to move during focusing, a driving unit configured to drive the focus lens, an operating member, a detecting unit configured to detect an operation of the operation member, and a control unit configured to perform a first focus control configured to control the driving unit in response to an autofocus use signal from the imaging apparatus, a second focus configured to control the driving unit in response to an operation of the operation member detected by the detecting unit, and a third focus control configured to control the driving unit as a focus control different from the first focus control and the second focus control. Where the first focus control is selected by a selection unit that selects one of the first focus control and the second focus control, the control unit restricts the second focus control when not receiving a permission signal for permitting the third focus control from the imaging apparatus, and performs the second focus control according to the operation of the operation member when receiving the permission signal.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
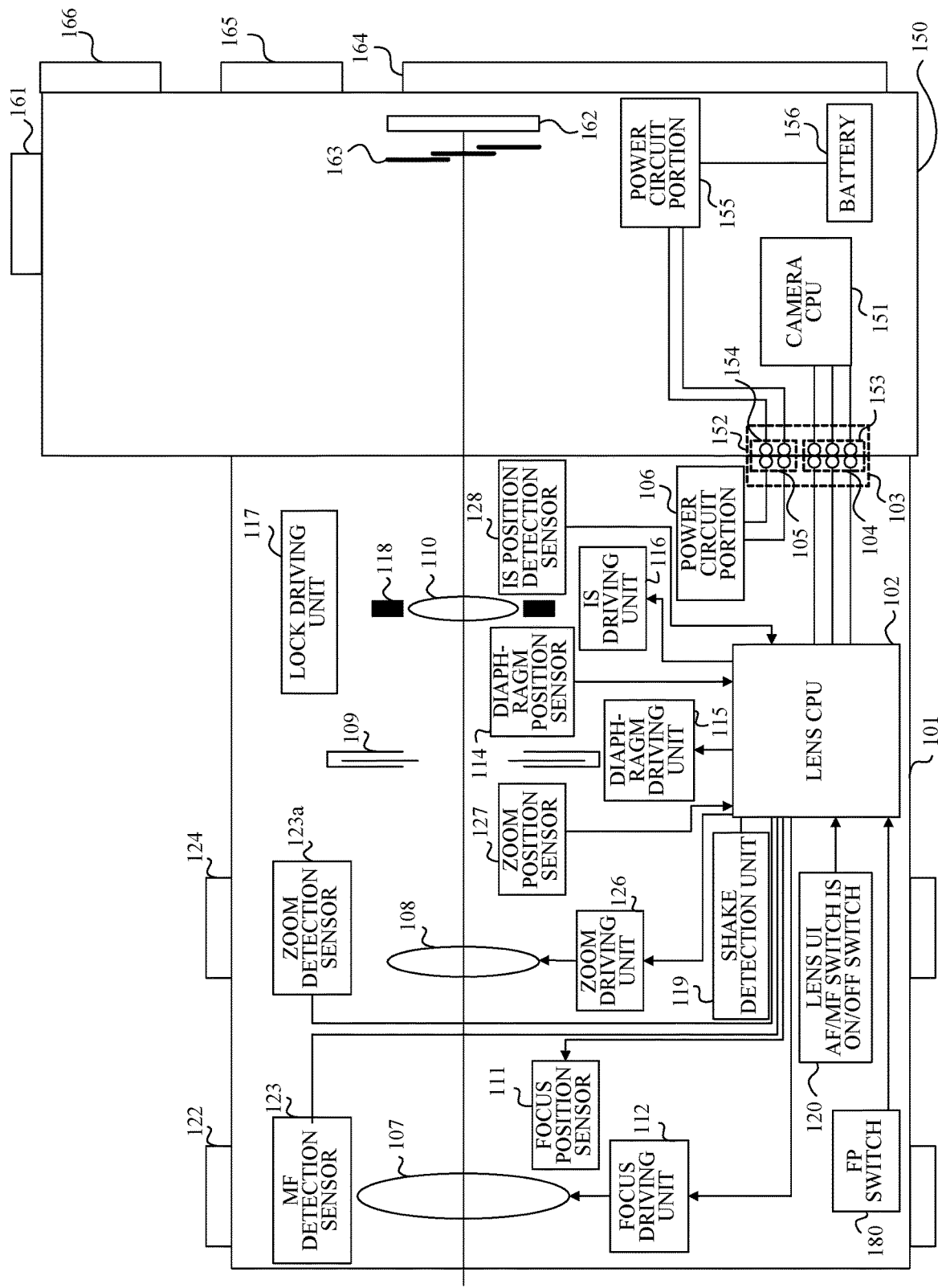
FIG. 1 illustrates a configuration of a camera system including an interchangeable lens according to one embodiment of the present invention.

FIG. 1 illustrates a configuration of an imaging system including an interchangeable lens apparatus (referred to as an interchangeable lens hereinafter) 101 according to a first embodiment of the present invention, and an imaging apparatus (referred to as a camera hereinafter) 150 to which the interchangeable lens 101 is detachably attached.

The camera 150 and the interchangeable lens 101 are communicatively connected via a communication terminal 153 in a camera contacting portion 152 and a communication terminal 104 in a lens contact portion 103 provided in each of them. The power is supplied from a power circuit portion 155 in the camera 150 to a power circuit portion 106 in the interchangeable lens 101 via a power terminal 154 in the camera contacting portion 152 and a power terminal 105 in the lens side contact unit 103.

The power circuit portion 155 in the camera 150 generates a variety of voltages used in the camera 150 and the interchangeable lens 101 from the voltage supplied from a battery 156 attached to the camera 150.

A camera CPU 151 as a camera control unit in the camera 150 instructs an unillustrated light metering sensor to perform the light metering in response to a half-press operation of a release switch included in a first camera operation unit 161 as a user interface provided in the camera 150. An F-number (aperture value) in a diaphragm (aperture stop) 109 is set according to the light metering result. The F-number may be set by the user through an F-number setting member included in the camera operation unit 161. The camera CPU 151 transmits the set the F-number or a diaphragm driving amount to the lens CPU 102.

An image sensor 162 provided in the camera 150 photoelectrically converts (captures) an object image formed by the imaging optical system in the interchangeable lens 101. The image sensor 162 includes a photoelectric conversion element, such as a CCD sensor and a CMOS sensor. The camera CPU 151 generates viewfinder image data using an imaging signal from the image sensor 162 before the release switch is fully pressed, and displays the viewfinder image on the display unit in a rear display unit 164 or an electronic viewfinder 166.

The camera CPU 151 detects a focus state of the object image (imaging optical system) using the focus detection signal output from the image sensor 162 in response to the half-press operation of the release switch. One focus state detecting method is an imaging plane phase difference detection method using the focus detection signal output from each a plurality of photoelectric conversion units provided in each pixel of the image sensor 162. It is also conceivable to use a contrast detection method using a contrast signal generated from a high frequency component in the focus detection signal (image signal) obtained from the image sensor 162. The camera CPU 151 generates a focus control signal as an autofocus (AF) signal to be transmitted to the interchangeable lens 101 based on the detected focus state.

The camera CPU 151 transmits to the lens CPU 102 an image stabilization (IS) start signal to start the IS operation for reducing an image blur caused by a lens shake such as a manual shake, in response to the half-press operation of the release switch.

The camera CPU 151 drives a shutter 163 in response to the full-pressing operation of the release switch, and causes the image sensor 162 to perform imaging for recording. The camera CPU 151 generates recording image data using an imaging signal output from the image sensor 162. The recording image data is still image data when a still image capturing mode is selected by the user operation of the menu displayed on a second camera operation unit 165 or a rear display unit 164, and is motion image data when a motion image capturing mode is selected. The camera CPU 151 records the generated the recording image data in an unillustrated recording medium or displays it on the rear display unit 164.

The imaging optical system included in the interchangeable lens 101 includes a focus lens 107, a magnification varying lens 108, a diaphragm (aperture stop) 109, and an image stabilization lens 110. The focus lens 107 moves in the optical axis direction of the imaging optical system during focusing. The magnification varying lens 108 moves in the optical axis direction during zooming. The diaphragm 109 adjusts a light amount by changing the diaphragm aperture diameter formed by the plurality of diaphragm blades. The IS lens 110 is shifted in a direction orthogonal to the optical axis based on lens shake such as the camera shake detected by a shake detection unit 119, so as to reduce (correct) image blur.

The focus lens 107, the magnification varying lens 108, the diaphragm 109, and the IS lens 110 are driven by a focus driving unit (driving unit) 112, a zoom driving unit 126, a diaphragm driving unit 115, and an IS driving unit 116, respectively. The focus driving unit 112 includes a motor such as a stepping motor or a nano USM, and moves the focus lens 107 by supplying an electric signal to the motor according to an instruction from the lens CPU 102 and by driving the motor. A lock driving unit 117 is provided for driving a lock member 118 that locks the shift of the IS lens 110.

The position of the focus lens 107, the position of the magnification varying lens 108, the F-number of the diaphragm 109 (the position of the diaphragm blade) and the shift position of the IS lens 110 are respectively detected by a focus position sensor 111, a zoom position sensor 127, a diaphragm position sensor 114, and an IS position sensor 128.

The focus driving unit 112, the zoom driving unit 126, the diaphragm driving unit 115, and the IS driving unit 116 are controlled by the lens CPU 102 as the lens control unit provided in the interchangeable lens 101. At this time, the lens CPU 102 uses the positions detected by the focus position sensor 111, the zoom position sensor 127, the diaphragm position sensor 114, and the IS position sensor 128. The lock driving unit 117 is also controlled by the lens CPU 102.

The lens CPU 102 drives the diaphragm 109 by controlling the diaphragm driving unit 115 according to the difference between the F-number received from the camera CPU 151 and the F-number detected by the diaphragm position detecting sensor 114.

When the lens CPU 102 receives the IS start signal from the camera CPU 151, the lens CPU 102 first controls the IS driving unit 116 to hold the IS lens 110 at a neutral position where its optical center is located at the optical axis of the imaging optical system. Next, the lock driving unit 117 is controlled to drive the lock member 118, thereby unlocking the IS lens 110. Thereafter, in response to the shake signal from the shake detection unit 119 that detects a lens shake, the lens CPU 102 controls the IS driving unit 116 so that the IS lens 110 is shifted to a position that reduces (corrects) the image blur due to the lens shake. At this time, the lens CPU 102 performs a feedback control over the IS driving unit 116 while monitoring the position of the IS lens 110 detected by the IS position detection sensor 128.

The lens CPU 102 stores characteristic information and optical information unique to the interchangeable lens 101 in an internal memory. The lens CPU 102 transmits the characteristic information and the optical information to the camera CPU 151.

The characteristic information includes a name of the interchangeable lens 101 (ID information for specifying the model type), a maximum communication speed, an open F-number, whether or not it is a zoom lens, a compatible AF system, an image height capable of the AF, etc. The optical information includes the position of the focus lens 107 (focus position) included in the imaging optical system in the interchangeable lens 101, the position of the magnification varying lens 108 (zoom position), and the focus sensitivity and the focus correction amount corresponding to the F-number of the diaphragm 109.

The lens CPU 102 controls the focus driving unit 112 so as to drive the focus lens 107 with the focus direction and the focus driving amount included in the focus control signal received from the camera CPU 151. This focus control will be referred to as an AF control as a first focus control.

The interchangeable lens 101 includes a focus ring 122 as a manual operation member (user interface (UI)) for the manual focus (MF), and an MF detection sensor 123 as a detecting unit for detecting an operation (rotation) of the focus ring 122. The interchangeable lens 101 further includes a zoom ring 124 as a manual operation member during zooming disposed around its outer circumference, and a zoom detection sensor 123a that detects an operation (rotation) of the zoom ring 124.

The lens CPU 102 detects that the focus ring 122 is operated (rotated) through the MF detection sensor 123. The lens CPU 102 controls the focus driving unit 112 so as to drive the focus lens 107 with the driving direction and the driving amount in accordance with the operation direction and the operation amount of the focus ring 122 detected using the signal from the MF detection sensor 123. This focus control will be referred to as an MF control as a second focus control.

The interchangeable lens 101 includes a lens operation unit 120 as a user interface. The lens operation unit 120 is an AF/MF switch as a selecting unit for allowing the user to select whether the lens CPU 102 is to perform the AF control (set AF mode) or the MF control (MF mode). The lens operation unit 120 includes an IS ON/OFF switch for allowing the user to select whether or not to execute the IS. The operation state of each switch of the lens operation unit 120 is sent to the lens CPU 102 and the camera CPU 151 via the lens CPU 102.

When the AF mode is selected in the AF/MF switch, the camera CPU 151 performs a focus detection for the AF in accordance with the half-press operation of the release switch. The lens CPU 102 starts the AF control in response to the AF start signal transmitted from the camera CPU 151, and controls the focus driving unit 112 in accordance with a focus control signal. When the MF mode is selected in the AF/MF switch, the camera CPU 151 transmits an MF permission signal (which will be described later) to the lens CPU 102 and does not perform a focus detection based on the AF. The lens CPU 102 can perform the MF control by receiving the MF permission signal transmitted from the camera CPU 151. The AF/MF switch may be provided to the camera 150.

The interchangeable lens 101 includes a focus preset (FP) switch 180. More specifically, the focus preset (FP) switch 180 has two operation members, one is a focus preset (FP) set switch, and the other is a focus preset (FP) play switch.

As the FP set switch is operated by the user, the lens CPU 102 stores the position of the focus lens 107 at that time in the internal memory of the lens CPU 102 as a preset position. Then, when the FP play switch is operated by the user while the focus lens 107 is moved from the preset position, the lens CPU 102 controls the focus driving unit 112 so that the focus lens 107 is moved to the stored preset position. This focus control will be referred to an FP control, which is among third focus controls.

The lens CPU 102 detects that the zoom ring 124 is operated (rotated) through the zoom detection sensor 123a. Then, the lens CPU 102 controls the zoom driving unit 126 so as to drive the magnification varying lens 108 with the zoom direction and zoom driving amount according to the operation direction and operation amount of the zoom ring 124 detected using the signal from the zoom detection sensor 123a. At this time, the lens CPU 102 controls the focus driving unit 112 so as to move the focus lens 107 to the position indicated by electronic cam data previously stored in the internal memory and to correct the focus variation (image plane displacement) according to the movement of the magnification varying lens 108. This focus control will be referred to as a zoom focus (ZF) control which is another third focus control.

As described above, the lens CPU 102 can perform the MF control on the condition that it receives the MF permission signal transmitted from the camera CPU 151. The MF permission signal is a signal for permitting the lens CPU 102 to control the focus driving unit 112 according to the operation direction and the operation amount of the focus ring 122 at an arbitrary timing (when the focus ring 122 is operated).

The lens CPU 102 can perform the FP control on the condition that it receives the FP permission signal transmitted from the camera CPU 151. The FP permission signal is a signal for permitting the control of the focus driving unit 112 for moving the focus lens 107 to the preset position according to the operation of the FP switch 180.

The lens CPU 102 can perform the ZF control on the condition that it receives the ZF permission signal transmitted from the camera CPU 151. The ZF permission signal is a signal for permitting the control of the focus driving unit 112 during focusing in accordance with the operation of the zoom ring 124 (movement of the magnification varying lens 108).

In the AF mode, the lens CPU 102 can perform the focus driving while maintaining the AF mode on condition that it receives the FP permission signal or the ZF permission signal from the camera CPU 151.

A description will now be given of the MF permission signal, the FP permission signal, and the ZF permission signal, which are the permission signals for the focus driving by the MF control, the FP control, and the ZF control. Since the focus driving by the MF control, the FP control, and the ZF control is all focus driving specific to the interchangeable lens 101 determined by the lens CPU 102, the state of the camera 150 (imaging state), the battery remaining amount, the timing in the imaging sequence, etc. are not considered. Thus, the camera CPU 151 issues the permission signals for the FP control, the ZF control, and the MF control to the lens CPU 102 in consideration of the state of the camera 150, the battery remaining amount, the timing in the imaging sequence, and the like.

Since the focus control permitted by the permission signal is limited to the focus control specific to the interchangeable lens 101, the permission for the focus driving based on the AF is not included. In the AF, the camera CPU 151 instructs the lens CPU 102 to perform the focus driving in consideration of the state of the camera 150, the battery remaining amount, the timing in the imaging sequence, and the like, and therefore the permission signal is unnecessary.

Figures 3, 4:
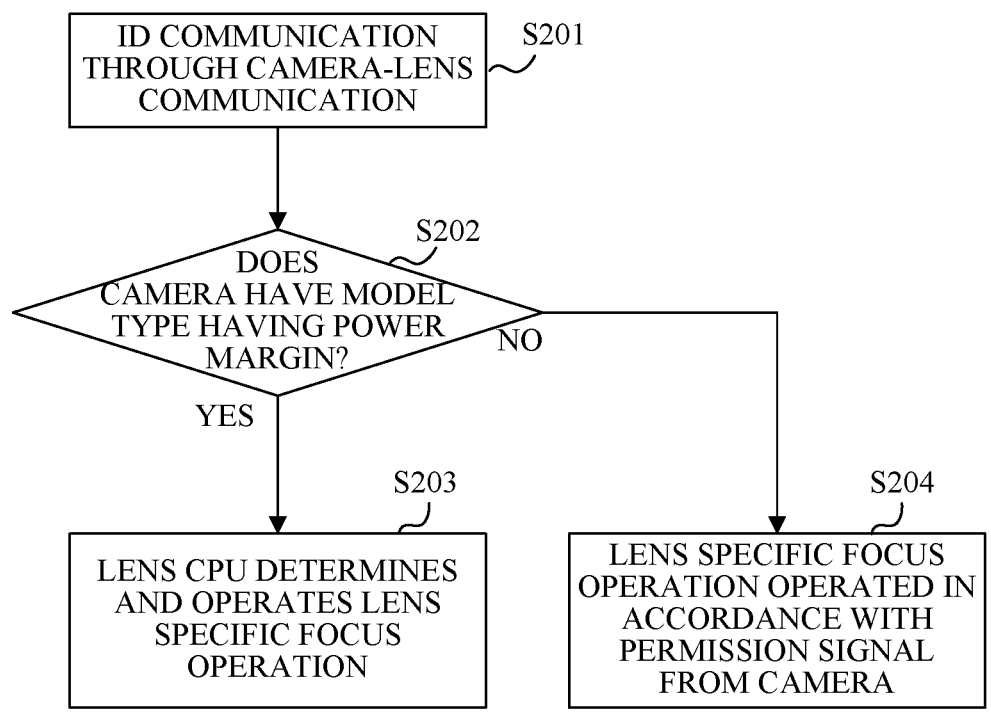
FIG. 3 illustrates a focus permission signal according to the embodiment.
FIG. 4 is a flowchart showing processing executed by the lens CPU according to the embodiment.

In the following description, the MF control, the FP control, and the ZF control will be collectively referred to as a lens specific focus control. The MF permission signal, the FP permission signal, and the ZF permission signal will be collectively referred to as a focus permission signal. FIG. 3 illustrates a specific data example of the focus permission signal.

The focus permission signal is exchanged between the camera CPU 151 and the lens CPU 102 via the communication terminals 153 and 104. For example, when the focus permission signal is one-byte data, as illustrated in FIG. 3, the respective bits are given meaning and transmitted from the camera CPU 151 to the lens CPU 102.

The lens CPU 102 performs only the lens specific focus control permitted by the received focus permission signal. For example, in permitting only the FP control and the ZF control, the camera CPU 151 transmits data "0×60" in the hexadecimal notation to the lens CPU 102 by setting "1" to bits 6 and 7 in the focus permission signal.

Thus, the camera CPU 151 transmits an appropriate focus permission signal to the lens CPU 102 in accordance with the state (imaging state) of the camera 150 and permits the lens specific focus control. The lens CPU 102 performs focus driving according to the permission signal.

Referring now to FIG. 4, a description will be given of the processing where the lens CPU 102 determines whether or not the MF control is permitted according to a combination of the information of the camera 150 mounted with the interchangeable lens 101 and the focus permission signal received from the camera 150. The lens CPU 102 executes this processing according to a computer program.

In the step S201, as the interchangeable lens 101 is attached to the camera 150, the camera CPU 151 and the lens CPU 102 communicate with each other to confirm the (model) type, performance, etc. of the camera 150 and the interchangeable lens 101. More specifically, the camera CPU 151 and the lens CPU 102 communicate identification information (camera ID and lens ID) assigned to each model type of the camera 150 and the interchangeable lens 101, respectively. The lens CPU 102 acquires information, such as a type and unique performance of the camera 150, from the camera ID received from the camera CPU 121. The unique performance means a large power margin amount of the camera 150 or the like, and is transmitted to the lens CPU 102 as information (a flag indicating the power capacity) different from the information indicating the type of the camera 150 in the camera ID.

Next, in the step S202, the lens CPU 102 determines, from the acquired camera ID, whether or not the camera 151 has a margin in the power supply (power) capacity as the state. This determination may be made according to a flag (power capacity expansion model type flag) indicating the power capacity included in the camera ID, rather than according to the information of the model type based on the camera ID. If the lens CPU 102 determines that the camera has a sufficient power capacity, the flow proceeds to the step S203 and otherwise the flow proceeds to the step 204.

In the step S203, the lens CPU 102 when receiving the focus permission signal transmitted from the camera CPU 151 performs the lens specific focus control according to the determination result of the received focus permission signal. The processing of the lens CPU 102 at this time will be described in detail later.

In the step S204, when the lens CPU 102 when receiving the focus permission signal transmitted from the camera CPU 151 performs the lens specific focus control according to the focus permission signal.

Figure 2:
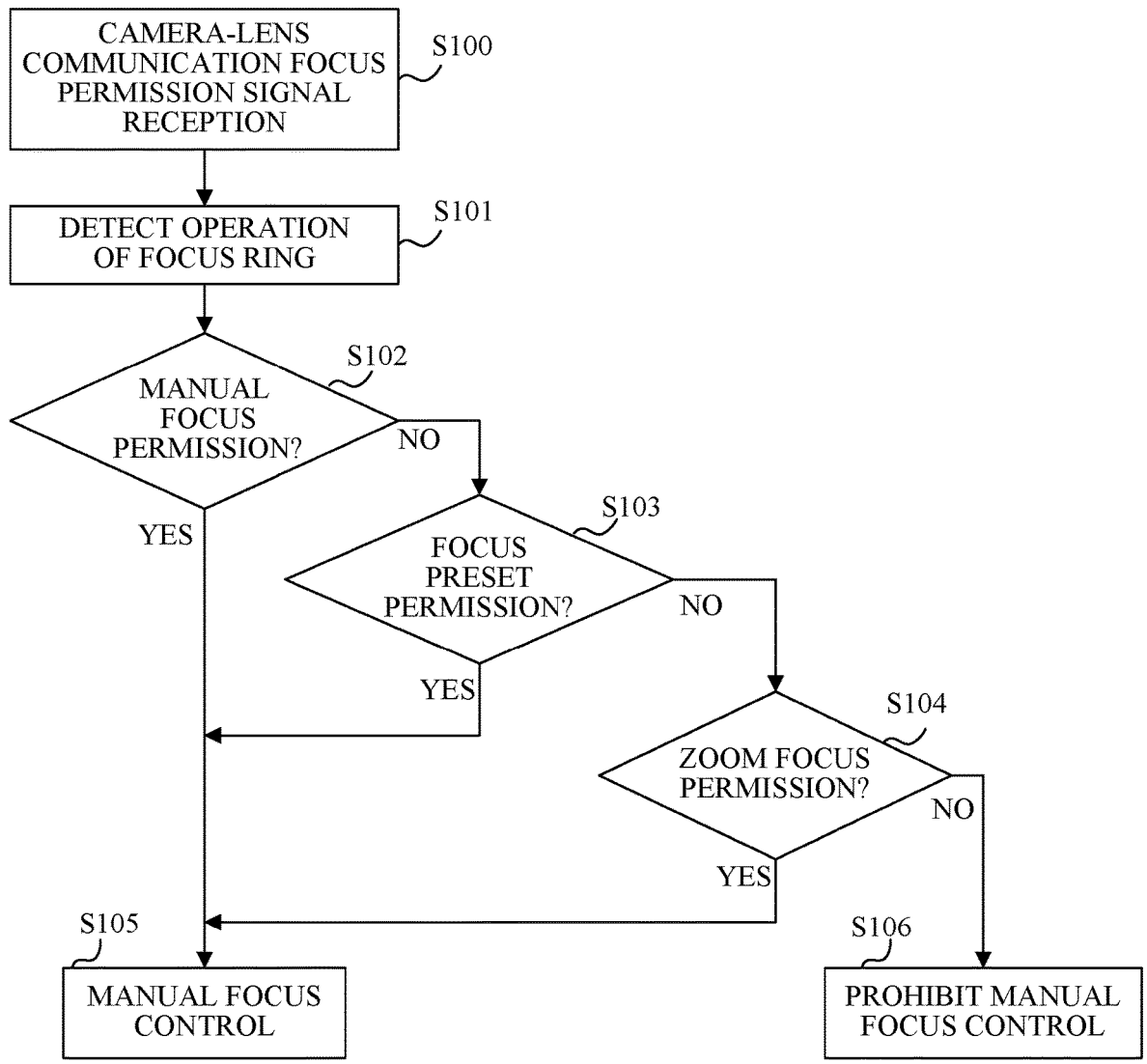
FIG. 2 is a flowchart of processing executed by a lens CPU according to this embodiment.

Referring now to FIG. 2, a description will be given of the processing (operation) in which the lens CPU 102 having received the focus permission signal performs the focus control according to the focus permission signal. Assume that the AF mode is selected by the AF/MF switch. Normally, when the AF mode is set, the MF control is prohibited, but when the MF permission signal is received from the camera CPU 151, the lens CPU 102 can perform the MF control. The lens CPU 102 executes this processing according to a computer program.

In the step S100, the lens CPU 102 receives a focus permission signal from the camera CPU 151.

In the step S101, the lens CPU 102 detects an operation of the focus ring 122. The steps S100 and S101 may be performed in reverse order.

Next, in the step S102, the lens CPU 102 determines whether or not the focus permission signal received in the step S100 is the MF permission signal. When the focus permission signal is the MF permission signal, the lens CPU 102 proceeds to step S105, and performs the MF control according to the operation of the focus ring 122. At this time, the lens CPU 102 and the camera CPU 151 maintain the AF mode without switching to the MF mode. On the other hand, when the focus permission signal is not the MF permission signal, the flow proceeds to the step S103.

In the step S103, the lens CPU 102 determines whether or not the received focus permission signal is an FP permission signal. When the focus permission signal is the FP permission signal, the lens CPU 102 proceeds to the step S105, and performs the MF control according to the operation of the focus ring 122. If the focus permission signal is not the FP permission signal, the flow proceeds to the step S104.

In the step S104, the lens CPU 102 determines whether the received focus permission signal is a ZF permission signal. When the focus permission signal is the ZF permission signal, the lens CPU 102 proceeds to the step S105 and performs the MF control in accordance with the operation of the focus ring 122.

On the other hand, when the focus permission signal is not the ZP permission signal, the lens CPU 102 proceeds to the step S106 to limit (prohibit) the MF control.

According to this embodiment, the lens CPU 102 receives the FP permission signal or the ZF permission signal from the camera CPU 151 in the AF mode, and thus performs the MF control without shifting to the MF mode even in the MF control prohibition (non-permission) state.

According to the above embodiment, when the first focus control (AF) is selected, the second focus control (MF) can be performed when the third focus control is permitted by the imaging apparatus. Therefore, the MF can be performed without switching the selection of the first focus control to the selection of the second focus control.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer is configured to perform function as the control unit. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-103559, filed on May 30, 2018, which is hereby incorporated by reference herein in its entirety.

What is claimed is:

1. An interchangeable lens apparatus detachably and communicatively attached to an imaging apparatus, the interchangeable lens apparatus comprising:
   a focus lens configured to move during focusing;
   an operating member; and
   a controller configured to perform a first focus control configured to control the focus lens in response to an autofocus use signal from the imaging apparatus, a second focus control configured to control the focus lens according to an operating amount of the operating member, and a third focus control configured to control the focus lens as a focus control different from the first focus control and the second focus control,
   wherein where the first focus control is selected by a selector that selects one of the first focus control and the second focus control, the controller restricts the second focus control when not receiving a permission signal for permitting the third focus control from the imaging apparatus, and performs the second focus control according to the operation of the operating member when receiving the permission signal.

2. The interchangeable lens apparatus according to claim 1, wherein the third focus control is a control configured to drive the focus lens to a stored preset position.

3. The interchangeable lens apparatus according to claim 1, wherein the third focus control is a control configured to drive the focus lens in order to correct a focus variation during zooming.

4. The interchangeable lens apparatus according to claim 1, wherein the controller determines whether or not the second focus control is permitted, according to a combination of information of the imaging apparatus acquired from the imaging apparatus and the permission signal.

5. The interchangeable lens apparatus according to claim 4, wherein the information of the imaging apparatus is information on a power margin amount of the imaging apparatus.

6. An imaging apparatus to which an interchangeable lens apparatus is detachably and communicatively attached, the imaging apparatus comprising a processor configured to transmit a permission signal of a focus control to the interchangeable lens apparatus,
wherein the interchangeable lens apparatus includes:
a focus lens configured to move during focusing;
an operating member; and
a controller configured to perform a first focus control configured to control the focus lens in response to an autofocus use signal from the imaging apparatus, a second focus control configured to control the focus lens according to an operation amount of the operating member, and a third focus control configured to control the focus lens as a focus control different from the first focus control and the second focus control, and
wherein where the first focus control is selected by a that selects one of the first focus control and the second focus control, the controller restricts the second focus control when not receiving a permission signal for permitting the third focus control from the imaging apparatus, and performs the second focus control according to the operation of the operating member when receiving the permission signal.

7. A control method for an interchangeable lens apparatus detachably and communicatively attached to an imaging apparatus, wherein a first focus control is configured to control a focus lens provided in the interchangeable lens apparatus in response to an autofocus use signal from the imaging apparatus, a second focus control is configured to control the focus lens according to an operation amount of an operating member provided to the interchangeable lens apparatus, and a third focus control is configured to control the focus lens as a focus control different from the first focus control and the second focus control, where the first focus control is selected by a selector that selects one of the first focus control and the second focus control, the control method comprising:
detecting the operation of the operating member;
determining whether or not a permission signal for permitting the third focus control is received from the imaging apparatus; and
restricting the second focus control when not receiving the permission signal, and performing the second focus control according to the operation amount of the operating member when receiving the permission signal.

8. A non-transitory computer-readable storage medium storing a program that causes a computer in an interchangeable lens apparatus to execute a control method for the interchangeable lens apparatus detachably and communicatively attached to an imaging apparatus, wherein a first focus control is configured to control a focus lens provided in the interchangeable lens apparatus in response to an autofocus signal from the imaging apparatus, a second focus control is configured to control the focus lens according to an operation amount of an operating member provided to the interchangeable lens apparatus, and a third focus control is configured to control the focus lens as a focus control different from the first focus control and the second focus control, where the first focus control is selected by a selector that selects one of the first focus control and the second focus control, the control method comprising:
detecting the operation of the operating member;
determining whether or not a permission signal for permitting the third focus control is received from the imaging apparatus; and
restricting the second focus control when not receiving the permission signal, and performing the second focus control according to the operation amount of the operating member when receiving the permission signal.

* * * * *